May 28, 1946.  F. W. MacD. MATTHEWS  2,401,173
STEREOSCOPIC PRESENTATION OF PICTURES
Filed Oct. 28, 1944  2 Sheets-Sheet 2
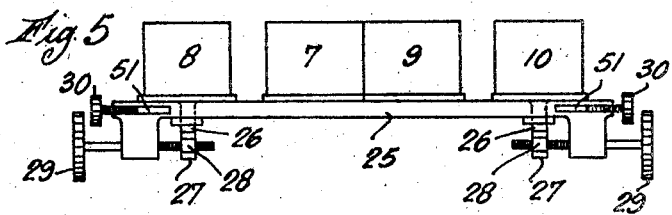
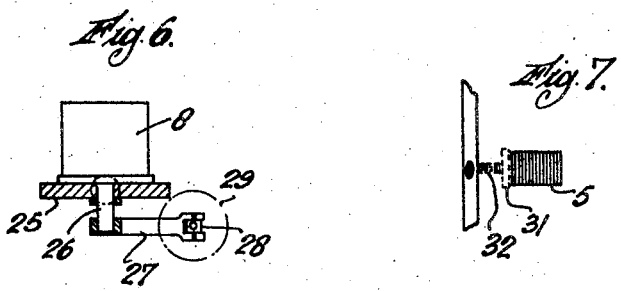
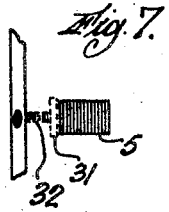
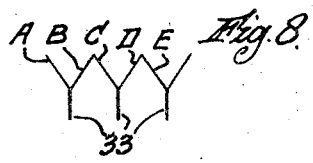

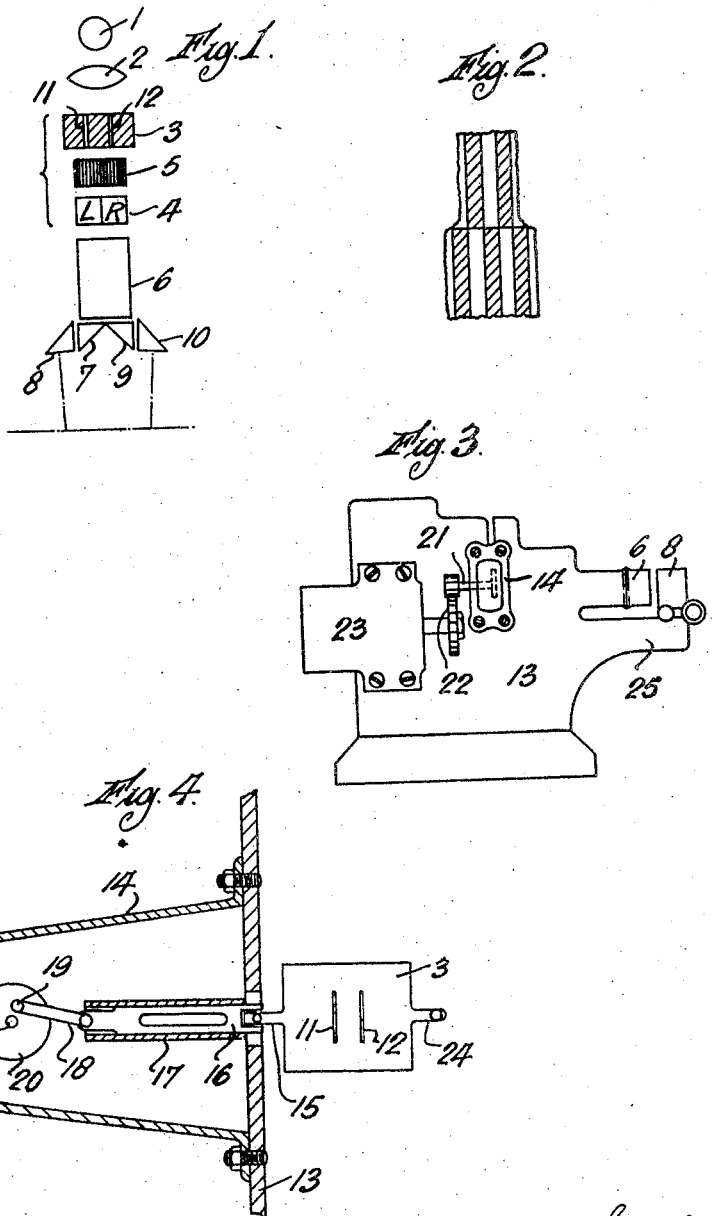

UNITED STATES PATENT OFFICE 2,401,173

STEREOSCOPIC PRESENTATION OF PICTURES

Francis William Macdonald Matthews, Ferndown, England

Application October 28, 1944, Serial No. 560,840
In Great Britain September 20, 1943

2 Claims. (Cl. 88—16.6)

The invention relates to the stereoscopic presentation of pictures, particularly when the pictures are projected on to a viewing screen. It is applicable not only to still pictures but also to moving pictures.

To secure a true stereoscopic effect the original scene must be recorded from two points of view corresponding to the two eyes of an observer, and the invention is directed to means by which the pictures so recorded are correctly viewed, that is to say, so that the left eye of the viewer perceives only the elements of the picture taken from the left point of view and the right eye those from the right point of view.

It has been proposed to subdivide a picture into narrow strips representing alternately elements of left eye and of right eye views and to place in front of the picture a grid of alternate transparent and opaque strips, so that the opaque grid strips masked all the left eye picture strips for the right eye and vice versa. It was then necessary to view the picture from one particular position, since the wrong picture elements would be masked from any other point of view, and the stereoscopic effect would be lost. This principle of subdivision is, however, used in the present invention, but in such a way as to overcome the limitation to one particular point of view.

According to the invention the picture as viewed is subdivided into narrow vertical strips representing alternately elements of left eye and right eye views and a shutter or its equivalent is so constructed and operated as to render visible in rapid succession pairs of strips each comprising a left eye strip and an adjacent right eye strip, the two strips of a pair appearing and disappearing simultaneously, but the left eye strip is located on the left hand side of the right eye strip in every pair.

Where the invention is applied to the projection of a cinematograph film having companion records side by side on each frame the apparatus according to the invention preferably comprises a film gate in which the film is fed in what may be called the longitudinal direction, a stationary correction screen close to the film having alternating transparent and opaque bars of equal widths running in the longitudinal direction, a shutter also close to the film oscillating transversely and having two slits running in the longitudinal direction at a distance apart approximately equal to the spacing of the left and right eye records of the same point in one frame but so that at any one instant both slits register with transparent bars of the correction screen or both with opaque bars, and optical means for projecting the companion film images into substantial coincidence on a viewing screen with left and right eye records intercalated between each other. This arrangement would also be suitable for still pictures with the companion images placed side by side as in the well known stereoscope, except that any suitable holding means may be used for the record material in place of the film gate, and no film feed would be required. What is termed the longitudinal direction would still be perpendicular to a straight line joining the companion images of a point on the left eye and right eye parts of the record.

Where the image is projected on to a viewing screen, the relief effect can be heightened by suitable arrangements at the screen. One form of screen for this purpose is made of flat elements sloping in opposite directions alternately to present a waved surface, the dimensions being such that the left eye elements of the picture are all projected on to screen elements sloping one way and the right eye elements on to screen elements sloping the other way. Baffles perpendicular to the general direction of the screen surface and directed towards the spectator may be added on the ridges to assist the separation of left and right eye pictures. The two picture strips which appear and disappear simultaneously are those which are projected on to the two sides of the same wave of the screen. "Wave" here refers to the screen as viewed by the spectator, who may be on the same side as the projector or on the opposite side.

Another arrangement uses a plain flat screen with baffles spaced similarly to those just referred to. These baffles may be attached to the screen or fixed close to it, or they may be spaced a short distance away. In the latter case the baffles could be constructed as a separate grid which may be moved away from the screen if desired. This grid would differ from the known grid referred to at the commencement of this specification in that its bars would have the major dimension of their cross-section perpendicular to the general screen surface and would be of very small dimensions in a direction parallel to that surface, whereas the grid of the prior art has bars and spaces between them which are all equal measured in a direction parallel to the screen.

The screen arrangements discussed above are applicable equally to opaque screens viewed by reflection and translucent screens viewed by transmission, but in every case the baffles or grid should be on the same side as the spectator.

As already stated, both the shutter and the correction screen must be close to the film in the case of cinematograph projection. While the sequence in which the three elements are placed is immaterial in theory, practical considerations make it necessary to place the correction screen between the shutter and the film.

The invention is illustrated and explained by the accompanying drawings, in which Figure 1 is a diagrammatic plan of the elements of the projector, Figure 2 is a diagram to show the intercalation of picture elements, Figure 3 is an elevation of the projector for showing films, Figure 4 is an elevation of the shutter drive, Figure 5 is a front elevation and Figure 6 is a side sectional elevation of the prism arrangement.

Figure 7 is a front elevation of the correction screen fixing, and

Figure 8 is a part section of a viewing screen.

Referring first to Figure 1, the projector for cinematograph film comprises a light source 1, a condenser 2, a transverse moving shutter 3, a gate for the film 4, a correction screen 5, a projection objective 6 and a set of combining prisms 7, 8, 9 and 10. The elements 3, 4 and 5 are shown turned out of their true position to indicate their nature. The bracket is intended to indicate that they are as close as possible together so as to be all in focus simultaneously on the projection screen. The correction screen 5 is mounted in the film gate as will be more precisely disclosed later and is located between the shutter 3 and the film 4.

The light source 1, condenser 2, film gate and projection objective 6 do not differ from normal practice and are therefore not illustrated in detail. The film 4 has in each frame a pair of companion pictures side by side representing left-eye and right-eye views respectively, as indicated by the letters L and R. It may be either monocrome or in natural colour.

The correction screen is subdivided into alternate transparent and opaque vertical strips of equal width, so that each of the two pictures when projected on to the screen is made up of strips of picture alternating with blank strips. The prisms 7 to 10 segregate the left-eye and right-eye pictures and are so adjusted that the elements of one picture are projected on to the screen between the elements of the other picture. If the transverse moving shutter were removed there would be on the screen a picture made up of alternate left-eye and right-eye elements, which could be viewed through a grid as in the method of the prior art already referred to. Figure 2 shows the picture elements correctly located as regards left and right on the screen, but for the sake of clarity the upper part shows only left-eye picture elements and the lower part only right-eye elements.

The transverse moving shutter 3 has in it two vertical slits 11 and 12 spaced apart by about the same distance as the companion representations on the film of some point in the scene portrayed. Each slit is of the same width as one transparent or opaque element of the correction screen 5, and the spacing must be such that when one slit registers with a transparent element of the correction screen, the other slit registers with that transparent element of which the image lies on the projection screen adjacent to that of the first transparent element. The relative location of the two images will depend on the side of the screen from which viewing takes place, but it must be such that the element of the left-eye picture appears on the left hand side of the element of the right-eye picture.

The shutter 3 is oscillated rapidly to left and right in such a manner that each slit traverses its corresponding half of the picture area. While it is necessary for each traverse from left to right or from right to left to occupy an interval of time not exceeding that during which one frame of the film is stationary in the gate, the highest practicable shutter speed should be aimed at, so that several shutter traverses are made on each frame of the film. The reason for this is that the higher is the speed of traverse the greater will be the amount of screen illumination.

It will be seen that during one traverse of the shutter 3 there will first be complete darkness on the projection screen, because the slits 11 and 12 are in register with opaque elements of the correction screen 5. As the shutter 3 moves, a gradually increasing amount of light will be allowed to pass through the slits 11 and 12 and transparent elements of the correction screen 5, the amount reaching a maximum when the slits 11 and 12 are fully in register with the transparent elements. Then the light will diminish again to complete darkness. During the whole of this period only one strip of each picture element will be seen, and these will be located with the left-eye element on the left hand side of the right-eye element.

With further movement of the shutter 3 the next element of each picture will appear in the same way at a position adjacent to that of the first pair of elements, and so on in succession right across the screen. The effect of this presentation of the picture is that each eye is aware only of the picture elements appropriate to it, and the complete picture is built up by persistence of vision.

A practical embodiment of the invention is shown in Figures 3 to 7. Parts of the projection equipment which do not differ from those in ordinary cinematograph practice are not shown or described except in so far as necessary for understanding the special parts required for the invention.

The equipment is mounted in a casing 13 having a forward extension to carry the prisms 7 to 10 in front of the projection objective 6, but otherwise of almost normal form. A secondary casing 14 is bolted to the side of the casing 13 to support and enclose the driving mechanism for the shutter 3. The shutter 3 has a lug 15 at one side, which is fastened by a screw to a shaft 16 movable longitudinally in a tubular guide 17. The guide 17 is let into the casing 13.

A connecting rod 18 is linked to the outer end of the shaft 16 and to a crank pin 19 on a disc 20, the latter being carried by a shaft 21 journalled in the casing 14. The shaft 21 is driven through gearing 22 by an auxiliary motor 23, since the normal motor would not have a sufficient reserve of power for the necessary high speed of the shutter 3. With a projector built specially for the invention one motor would be provided for both drives. A second lug 24 is provided on the other side of the shutter 3 in case it may be desired to reverse the shutter for front or rear viewing. Other shutters can be fitted when required having other slit dimensions.

Such other shutters would have lugs like 15 and 24 at one or other ends.

It will be noted from Figure 1 that the light forming the image of the left-eye picture is reflected by the cathetus face of prism 7 in a direction perpendicular to the optical axis of the projection system and away from that axis and is reflected again by the prism 8 into nearly the original direction. Likewise the light forming the image of the right-eye picture is reflected by the cathetus faces of prisms 9 and 10, the prisms 9 and 10 being so set that correct intercalation of the picture elements is produced on the screen, as defined above.

Figures 5 and 6 show the mounting of the prisms. Prisms 7 and 9 are fixed on the base 25 integral with the casing 13, while prisms 8 and 10 are supported by vertical stems 26, 26 rotatable in the base 25. The stem 26 of the prism 8 has a forward arm 27 carrying at its outer end a swivel nut 28. A milled head screw 29 is rotatable in a lug of the base 25 but is restrained by known means from longitudinal movement. The restraining means is not shown but may comprise a shoulder on the stem to bear against the outer face of the lug and a locked nut to bear against the inner face. A locking screw 30 presses a distance piece 51 against the stem 26 to hold the prism 8 in its adjusted position. The adjustment mechanism for the prism 10 is as described for the prism 8.

Figure 7 shows the fixing arrangement for the correction screen 5. The front of the gate aperture is slotted round to receive the screen, which when placed in position lies flush with the front surface of the gate aperture. A small metal strip 31 is placed against one side of the screen 5 and a screw 32 in the side of the gate presses on the strip 31 to hold the screen 5 firmly against the opposite side of the slotted recess in the gate.

Some notes will now be given regarding the preparation of the shutter and correction screen. It will be assumed that the projector is designed for 16 mm. film. Of this width 9.6 mm. is available for the photographic image, and the left eye and right eye pictures of each frame thus occupy 4.8 mm. of the film width. It will further be assumed that the image width on the projection screen is 9 inches subdivided into vertical strips about $\frac{1}{16}$ inch wide.

The correction screen has an effective area 9.6 mm. wide and 7.2 mm. high to register with the picture area of the film. Theoretically there should be in each half of the screen 72 opaque bars and 72 clear bars each 0.00131" wide, the first bar on the left of one half being clear and the first on the left of the other opaque. There would then be two bars of the same kind adjacent to each other at the centre of the screen.

This difficulty can be surmounted by having 143 opaque bars and 143 clear bars alternating across the width of the screen. No special arrangement is then necessary at the centre.

The screen can be produced by photographing a model of the appropriate number of lines on the required scale on 16 mm. film. The film used for this purpose should be of the highest quality in regard to contrast and fine grain properties. The positive film frame bearing the image of the lines is bonded between two very thin plates of glass or methyl methacrylate plastic.

The shutter must have its slits located to match the bars of the correction screen with which it is to be used, and the most convenient way of producing it is by photography from the model used for making the screen. After the exposure has been made for producing the screen, all the elements of the model are masked in white except the two black elements required. The camera and the model are left in the same position as for photographing the screen, and the exposure is made on a fresh frame of film. Two correctly located clear strips on a black background are thus produced after development.

The film element may itself be mounted in the same manner as the correction screen and be employed as the actual shutter, provided there are opaque areas at least 4.8 mm. wide outside the clear elements. Such an area may have to be provided by an extension. Alternatively the film element can be used as a template to locate the correct positions on a metal shutter, the slits being produced by microscopic cutting.

As already stated above the projection screen may assume different forms. Figure 8 shows a section of a small portion of screen in the form preferred for viewing at a short distance. The screen surface itself is of waved or zig-zag shape, and the dimensions are such that successive left eye elements of the picture are received on the portions A, C and E, while successive right-eye elements of the picture are received on the portions B and D. Baffles 33 are fixed to the wave crests of the screen on the viewing side and project perpendicularly to the general surface of the screen. The screen itself is opaque or translucent according to the side on which the projector is to be placed.

For larger screens in the case of more viewers it will probably be found preferable to use a waved or flat screen with a separate baffle grid to be placed in front of it. The waved screen may in either case be made of moulded plastic.

It will be seen that by means of the invention pictures can be seen in natural relief without any selecting device such as red and green glasses or differentially polarised elements and without any apparatus individual to the spectator, who is not confined to one particular position for perceiving the stereoscopic effect. Since no colour selection is used, the pictures can be projected in natural colours and are not limited to monochrome.

What I claim is:

1. Apparatus for the stereoscopic presentation of pictures on a film record with left-eye and right-eye views located side by side thereon, which comprises means for holding the record, a stationary correction screen close to the record having alternate transparent and opaque bars of equal widths running in the vertical direction of the picture, a shutter also close to the record having two slits at a distance apart approximately equal to the spacing of the left-eye and right-eye representations of the same point in the record but so that at any one instant both slits register with transparent bars of the correction screen or both with opaque bars, means for oscillating the shutter rapidly in a direction transverse to the slits, a viewing screen, optical means for projecting the companion views into substantial coincidence thereon with left-eye and right-eye views intercalated between each other, the arrangement being that in every pair of strips simultaneously appearing on the viewing screen the left-eye strip is seen by the spectator on the left-hand side of the right-eye strip.

2. Apparatus for the stereoscopic presentation of pictures on a cinematograph film record with a left-eye view and a right-eye view located side by side on each frame, which comprises a film gate for feeding the film in the vertical direction of the individual frames, a stationary correction screen mounted in the gate close to the record having alternate transparent and opaque bars of equal widths running in the vertical direction of the picture, a shutter also close to the record having two slits at a distance apart approximately equal to the spacing of the left-eye and right-eye representations of the same point in the record but so that at any one instant both slits register with transparent bars of the correction screen or both with opaque bars, means for oscillating the shutter rapidly in a direction transverse to the slits, a viewing screen, optical means for projecting the companion views into substantial coincidence thereon with left-eye and right-eye views intercalated be-between each other, the arrangement being that in every pair of strips simultaneously appearing on the viewing screen the left-eye strip is seen by the spectator on the left-hand side of the right-eye strip.

FRANCIS WILLIAM MACDONALD
MATTHEWS.